US009995382B2

(12) United States Patent
Chu et al.

(10) Patent No.: US 9,995,382 B2
(45) Date of Patent: Jun. 12, 2018

(54) METHOD FOR DETERMINING TIMING OF OIL FILLING FOR A BALL SCREW

(71) Applicant: HIWIN TECHNOLOGIES CORP., Taichung (TW)

(72) Inventors: Wei-Ying Chu, Taichung (TW); Hsiao-Ting Wen, Taichung (TW); Yih-Chyun Hwang, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 0 days. days.

(21) Appl. No.: 15/644,774

(22) Filed: Jul. 8, 2017

(65) Prior Publication Data
US 2017/0307066 A1    Oct. 26, 2017

Related U.S. Application Data

(63) Continuation-in-part of application No. 14/179,748, filed on Feb. 13, 2014, now abandoned.

(51) Int. Cl.
| F16H 57/01 | (2012.01) |
| G01M 13/02 | (2006.01) |
| F16H 57/04 | (2010.01) |
| F16H 25/22 | (2006.01) |
| F16H 57/00 | (2012.01) |
| F16N 29/00 | (2006.01) |

(52) U.S. Cl.
CPC ..... *F16H 57/0497* (2013.01); *F16H 25/2204* (2013.01); *F16H 57/0006* (2013.01); *F16H 57/0408* (2013.01); *F16N 29/00* (2013.01)

(58) Field of Classification Search
CPC ...... F16H 57/01; F16H 57/0408; F16N 29/00; F16N 29/02; G01M 13/00; G01M 13/04; G01M 13/045; F16C 29/08; F16C 33/6637; F16C 33/6625
USPC ................................ 74/89.44, 89.43; 702/34
See application file for complete search history.

(56) References Cited

U.S. PATENT DOCUMENTS 5,285,457 A * 2/1994 Funakubo ............... H01S 3/036
340/635
7,100,742 B2 * 9/2006 Gunacker ................ B61K 3/00
184/3.1

FOREIGN PATENT DOCUMENTS

| JP | 1998318261 A | 12/1998 |
| JP | 2004347401 A | 12/2004 |

* cited by examiner

*Primary Examiner* — Leslie J Evanisko
(74) *Attorney, Agent, or Firm* — Bruce Stone LLP; Joseph Bruce

(57) ABSTRACT

A method for determining timing of oil filling for a ball screw can determine whether the oil film in a specific time period is sufficient, falling or insufficient, and then know the optimum timing of oil filling, by comparing the sum of the slope values within respective time periods with a predetermined value. The method is further capable of determining the timing of oil filling even when the rotation speed of the ball screw changes. The method includes a step of signal acquisition, a step of converting signal, a step of defining and saving eigenvalues, a step of calculating eigenvalues, and a step of determining oil filling.

7 Claims, 14 Drawing Sheets

METHOD FOR DETERMINING TIMING OF OIL FILLING FOR A BALL SCREW

This application is a continuation in part of U.S. patent application Ser. No. 14/179,748 which claims the benefit of the earlier filing date of Feb. 13, 2014. The entire specification of which is incorporated herein by reference.

BACKGROUND OF THE INVENTION

Field of the Invention

The present invention relates to a ball screw, and more particularly to a method for determining timing of oil filling for the ball screw.

Description of the Prior Art

The ball screw comprises a nut which is movably screwed on a screw via a plurality of balls. The nut can move along the screw with little friction via the balls, and the ball screw is suitable for use on various machines requiring precision motion due to its precision and low friction properties. Therefore, lubrication of the helical raceway of the ball screw is very important, otherwise, the friction between the nut and the screw would speed up the wear of the ball screw. In this case, the timing of oil filling (feeding lubrication oil into the ball screw) becomes more important. Here follows are some conventional methods for determining the timing of oil filling.

A method, as disclosed in JP Patent No. 2004347401, judges whether the bearing is properly lubricated by using an accelerometer to detect the vibration signal of the bearing, then convert the vibration signal into spectrum signal, and compare the converted signal to a reference value. However, a database must be set up to define the reference value, and the spectrum signal has to be analyzed and compared to the reference value. Therefore, this method is expensive and cannot be applied directly to the ball screw (especially for the ball screw and ball spline).

Another method, as disclosed in JP Patent No. 1998-318261, judges the timing of oil filling by using a detector to detect the signal amplitude and period. However, this method did not define a specific range for the signal amplitude and period, which makes this method difficult for application. Besides, this method cannot be applied directly to the ball screw, especially for the ball screw and ball spline.

The present invention has arisen to mitigate and/or obviate the afore-described disadvantages.

SUMMARY OF THE INVENTION

The primary objective of the present invention is to provide a method for determining timing of oil filling for a ball screw, wherein the method can determine whether the oil film in a specific time period is sufficient, falling or insufficient, and then know the optimum timing of oil filling, by comparing the sum of the slope values within the respective time periods with a predetermined value. Hence, the method of the present invention reduces the implementation cost and makes it easy to determine the timing of oil filling.

Another objective of the present invention is to provide a method for determining timing of oil filling for a ball screw, which is capable of determining the timing of oil filling even when the rotation speed of the ball screw changes.

A method for determining timing of oil filling for a ball screw in accordance with the present invention comprises: a step of signal acquisition including placing a detector capable of measuring vibration on the ball screw to acquire vibration signals generated during movement of the ball screw, and saving the acquired vibration signals in a back-end storage device; a step of converting signals including converting the vibration signals into eigenvalues by using an algorithm which is stored in advance in the back-end storage device; a step of normalization being used to get rid of vibration signal difference caused by rotation speed change of the ball screw; a step of defining and saving eigenvalues including forming a curve of eigenvalue change by defining and saving relations between the eigenvalues and time points on coordinates, wherein a longitudinal axis represents eigenvalues, and a horizontal axis represents the time periods and is divided into a plurality of time periods; a step of normalization being used to get rid of vibration signal difference caused by rotation speed change of the ball screw; a step of calculating eigenvalues including calculating each slope value based on every two neighboring time points and calculating a sum of the slope values within the time periods; a step of determining oil filling including determining whether the sum of the slope values within the respective time periods is smaller than a predetermined value, when the sum of the slope values within the respective time periods is smaller than the predetermined value, there is no sufficient oil film, and if the sum of the slope values within the respective time periods is larger than the predetermined value, there is sufficient oil film; and a step of outputting oil filling signals including sending out, by the back-end storage device, the oil filling signals to PLC (Programmable Logic Controller) or a lubricating device of the ball screw to start to lubricate the ball screw, when the back-end storage device detects that there is no sufficient oil film.

Preferably, the method for determining timing of oil filling for the ball screw further comprises a step of signal processing between the step of signal acquisition and the step of converting signals, and the step of signal processing includes processing the vibration signals produced in the step of signal acquisition so as to reduce noise contained in the vibration signals, and outputting the processed vibration signals which will be converted into the eigenvalues during the step of converting signals.

Preferably, each of the slope values is a ratio of a variation between two neighboring eigenvalues to a time variation between two neighboring time points, there is sufficient oil film when the slope value is 0.01-0.8, the oil film is receding when the slope value is 0.005-0.01, and there is no sufficient oil film when the slope value is less than 0.005.

Preferably, the eigenvalues are root mean square, and Envelopment root mean square.

Preferably, the detector is disposed on a screw or a nut of the ball screw.

Preferably, the back-end storage device is a storage device connected to back end of the detector, and capable of acquiring signals, converting signals, processing signals, determining oil filling, and outputting an oil-filling signal.

Preferably, the back-end storage device is disposed in the detector, and capable of acquiring signals, converting signals, processing signals, determining oil filling, outputting oil-filling signals, and measuring vibration.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
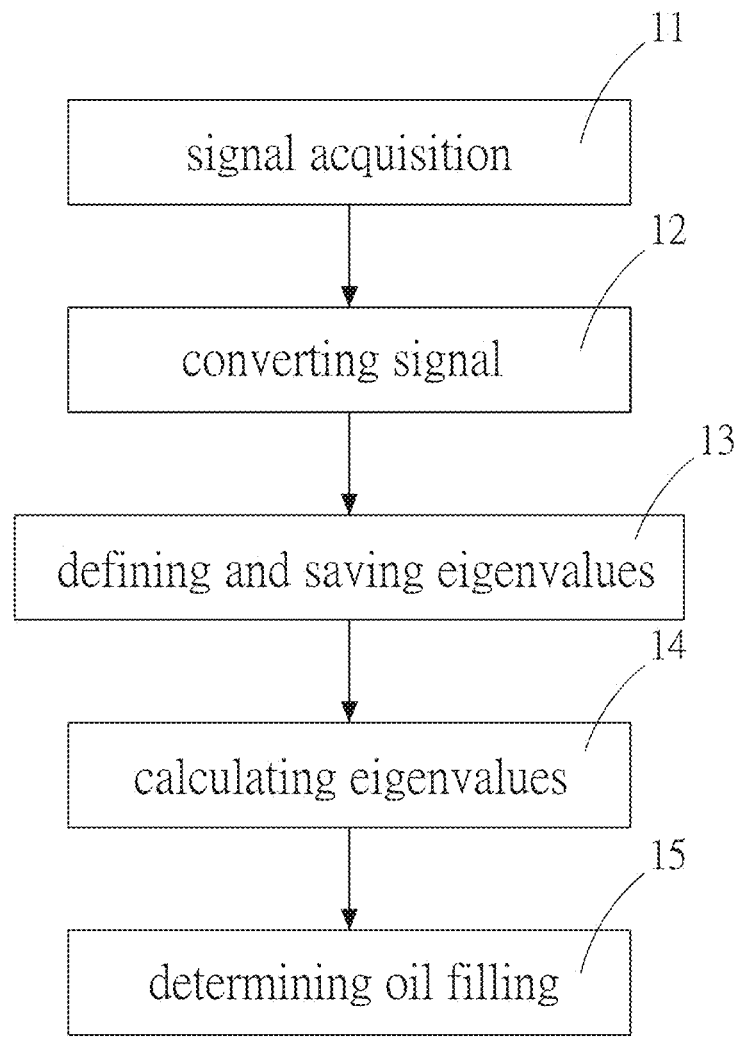
FIG. 1 is a flow chart showing the method for determining timing of oil filling for a ball screw in accordance with a first preferred embodiment of the present invention.

Referring to FIG. 1, a method for determining timing of oil filling for a ball screw in accordance with a first preferred embodiment of the present invention comprises: a step 11 of signal acquisition, a step 12 of converting signal, a step 13 of defining and saving eigenvalues, a step 14 of calculating eigenvalues, and a step 15 of determining oil filling.

Figure 2:
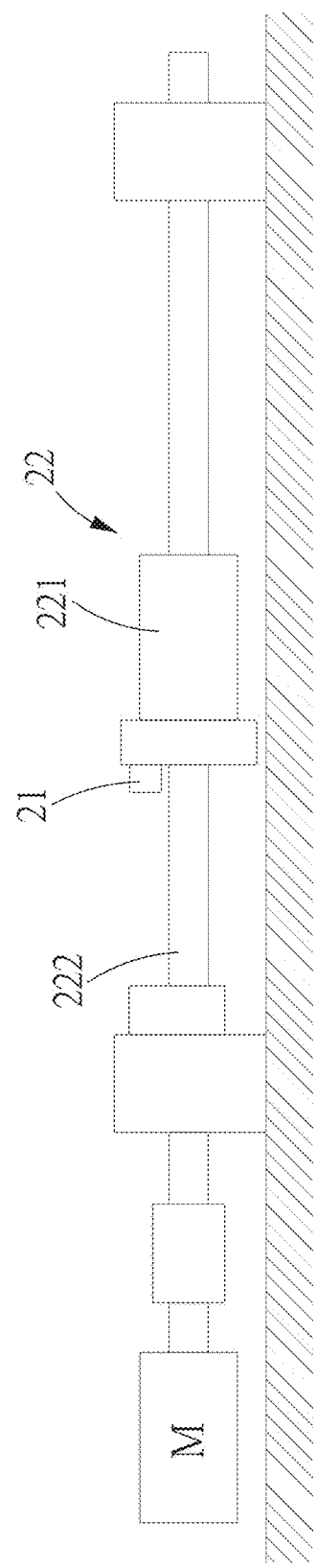
FIG. 2 is a side view showing that the detector of the method for determining timing of oil filling for a ball screw in accordance with the first preferred embodiment of the present invention is disposed on the nut of a ball screw.
Figure 3:
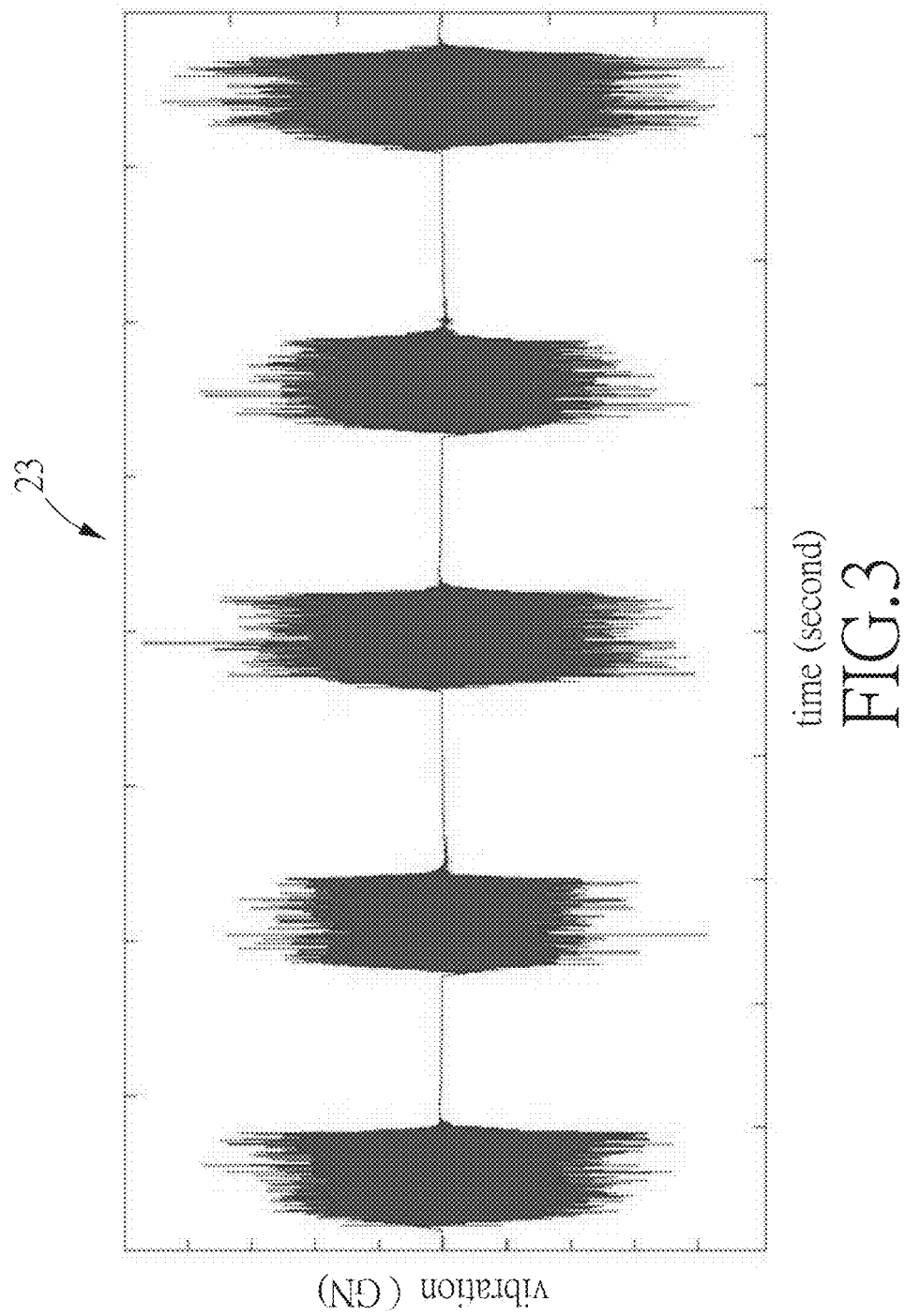
FIG. 3 shows that the physical signals produced in the step of signal acquisition of the present invention are vibration signals produced by rotation of the ball screw.

As shown in FIGS. 2 and 3, the step 11 of signal acquisition includes placing a detector 21 on the ball screw 22 to continuously acquire (detect) physical signals 23 generated during movement of the ball screw 22. In this embodiment, the detector 21 is disposed on the nut 221 of the ball screw 22, and can also be disposed on the screw 222. The physical signals 23 are vibration signals produced when the ball screw 22 rotates at the rotation speed of 3000 rpm, and they can also be pressure wave signal or resistance signals produced when the ball screw 22 rotates.

The step 12 of converting signal includes converting the physical signals 23 into eigenvalues by algorithm. In this embodiment, the eigenvalues are RMS (root mean square), Envelopment RMS, Wavelet, Fast Fourier Transform (FFT, $$RMS = \frac{\sqrt{\sum_{i=1}^{n} x_i^2}}{n} = \sqrt{\frac{x_1^2 + x_2^2 + \ldots + x_n^2}{n}}$$

Wherein the n represents the number of data acquired, and the x represents the physical quantity of each data.

Figure 4:
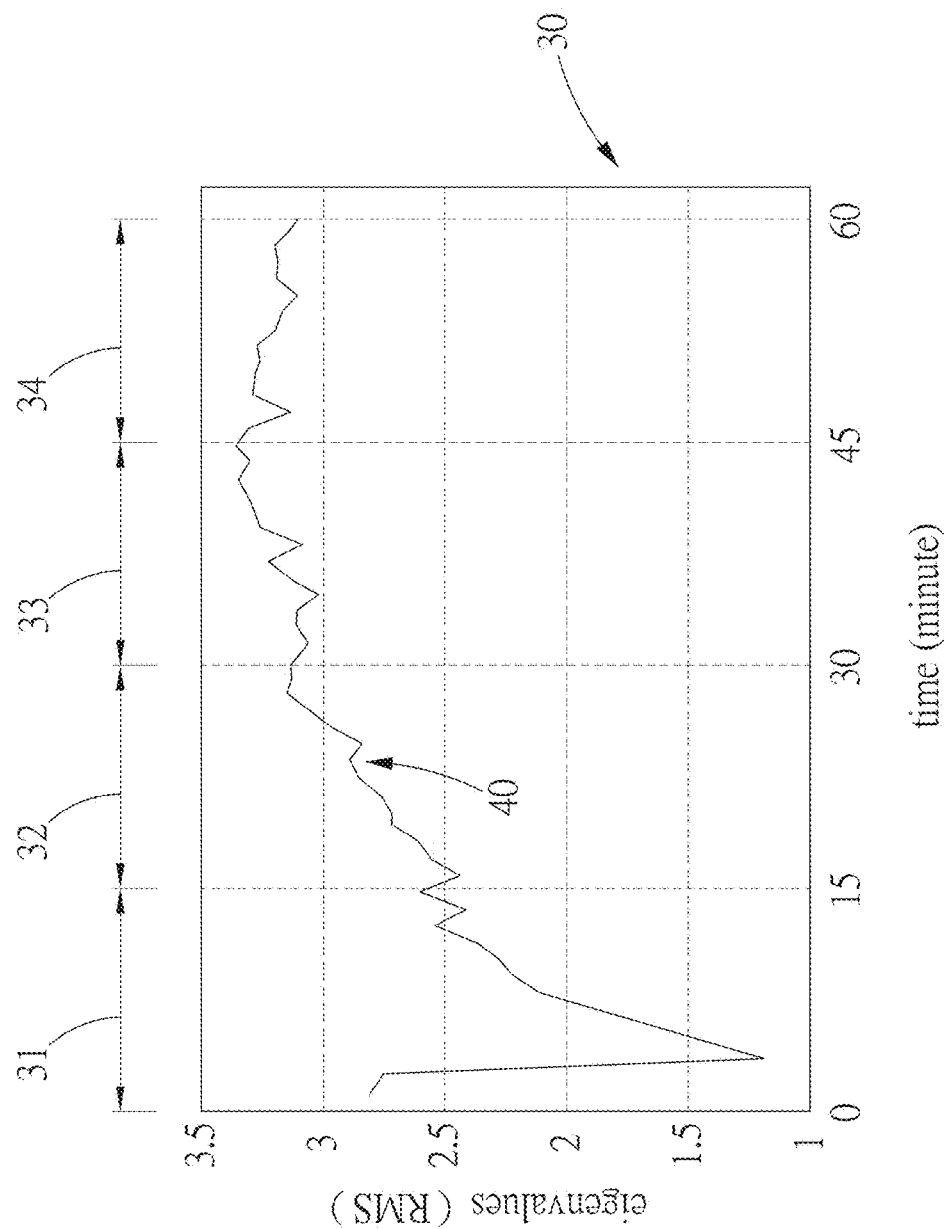
FIG. 4 shows the curve of eigenvalue change in accordance with the first embodiment of the present invention, which is set up on coordinates.

As shown in FIG. 4, the step 13 of defining and saving eigenvalues includes forming a curve 40 of eigenvalue change by defining and saving the relations between the eigenvalues and the time points on coordinates 30, wherein the longitudinal axis represents eigenvalues, and the horizontal axis represents the time periods and is divided into a plurality of time periods. In this embodiment, the horizontal axis of the coordinates 30 is divided by every 15 minutes into a first time period 31, a second time period 32, a third time period 33 and a fourth time period 34.

The step 14 of calculating eigenvalues includes calculating each slope value based on every two neighboring time points and calculating the sum of the slope values within the first, second, third and fourth time periods, 31, 32, 33, 34. For example, the second time period 32 is equally divided into 15 time points, one minute for each time points, and the calculated eigenvalues by calculating each slope value based on every two neighboring time points refer to the slope value between the eigenvalue at the first time point and the eigenvalue at the second time point, the slope value between the eigenvalues of the second and third time points, the slope value between the eigenvalues of the third and fourth time points . . . , and the slope value between the eigenvalues of the fourteenth and fifteenth time points.

Figure 5:
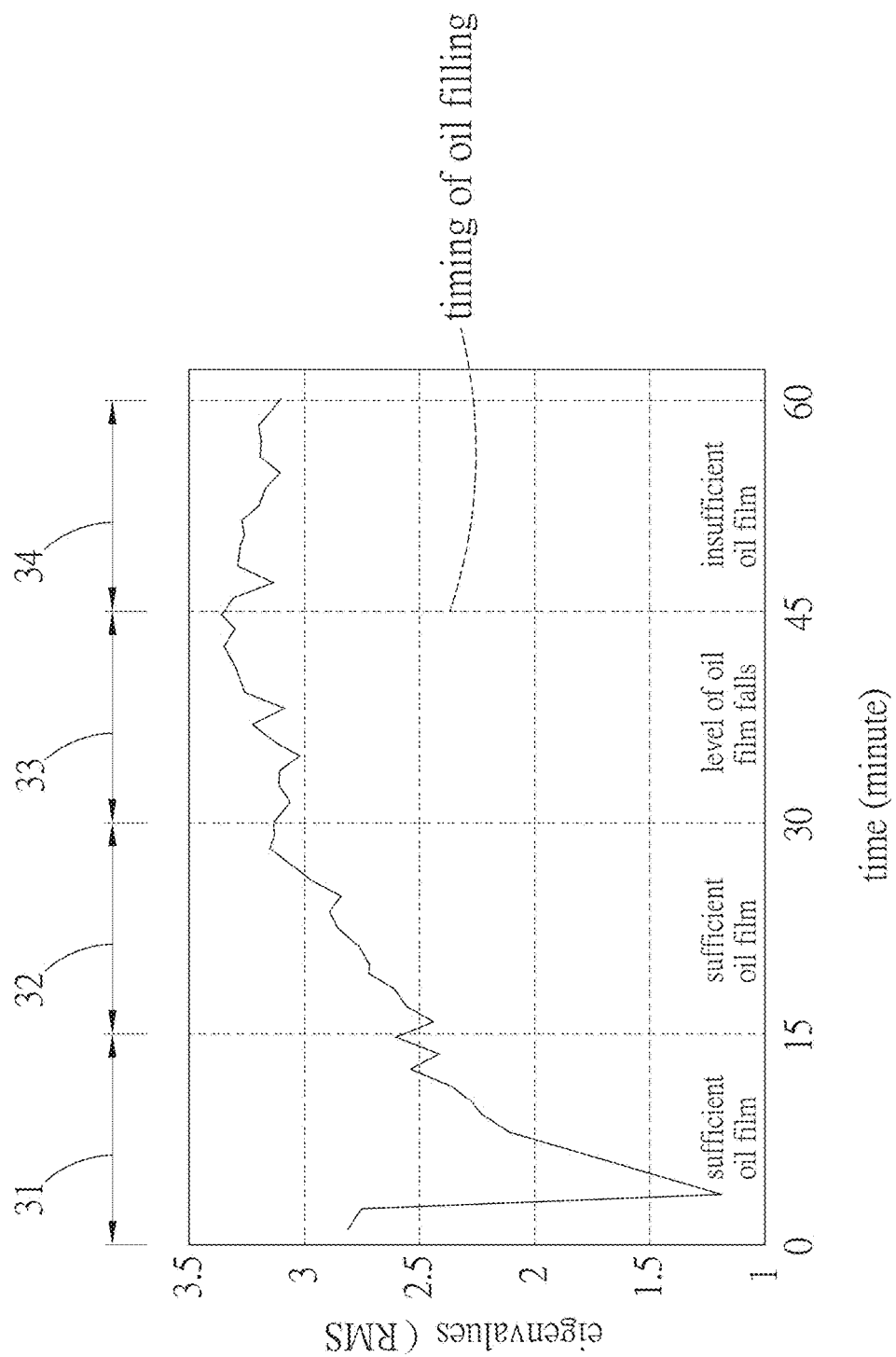
FIG. 5 is an illustrative view in accordance with the first embodiment of the present invention, showing the oil film state within the respective time periods.

The step 15 of determining oil filling includes determining whether the sum of the slope values within the respective time periods is smaller than a predetermined value. If the sum of the slope values within the respective time periods is smaller than the predetermined value, it means that there is no sufficient oil film, and if the sum of the slope values within the respective time periods is larger than the predetermined value, it means that there is sufficient oil film, and the predetermined value can be set as desired. As shown in FIG. 5, when the sum (which is 10 for instance) of the slope values within the first time period 31 is larger than the predetermined value (which is 0 for instance), and the sum (which is 5 for instance) of the slope values within the second time period 32 is larger than the predetermined value (which is 0 for instance), it means that the oil film within the ball screw is sufficient, and no oil filling is required. When the sum (which is 1 for instance) of the slope values within the third time period 33 is larger than but close to the predetermined value (which is 0 for instance), it means that the oil film within the ball screw is sufficient, and no oil filling is required, however the level of the oil film is falling (at a low level). When the sum (which is −1 for instance) of the slope values within the fourth time period 34 is smaller than the predetermined value (which is 0 for instance), it means that the oil film within the ball screw is insufficient, and it requires oil filling, and the optimum timing of oil filling can be at the connection between the third and fourth time periods 33, 34.

It is to be noted that, in the step 15 of determining oil filling, when the oil gradually becomes insufficient, the slope change of the curve 40 of eigenvalue change will gradually slow down. In addition to the above method, the slowing down of the slope change of the curve 40 of eigenvalue change can also be known when the predetermined value, the volume of slope change or the slope change changes from positive to negative.

What mentioned above are the steps of the first preferred embodiment of the present invention, for a better understanding of the invention, its operating advantages and the specific objects attained by its uses, reference should be had to the following descriptive matter.

The determination of the timing of oil filling in accordance with the present invention does not require defining a threshold by setting up in advance a database, and comparing with the threshold set up by the database. The present invention can determine whether the oil film in a specific time period is sufficient, falling or insufficient, and then know the optimum timing of oil filling, by comparing the sum of the slope values within the respective time periods with a predetermined value. Hence, the method of the present invention reduces the implementation cost and makes it easy to determine the timing of oil filling.

Figure 6:
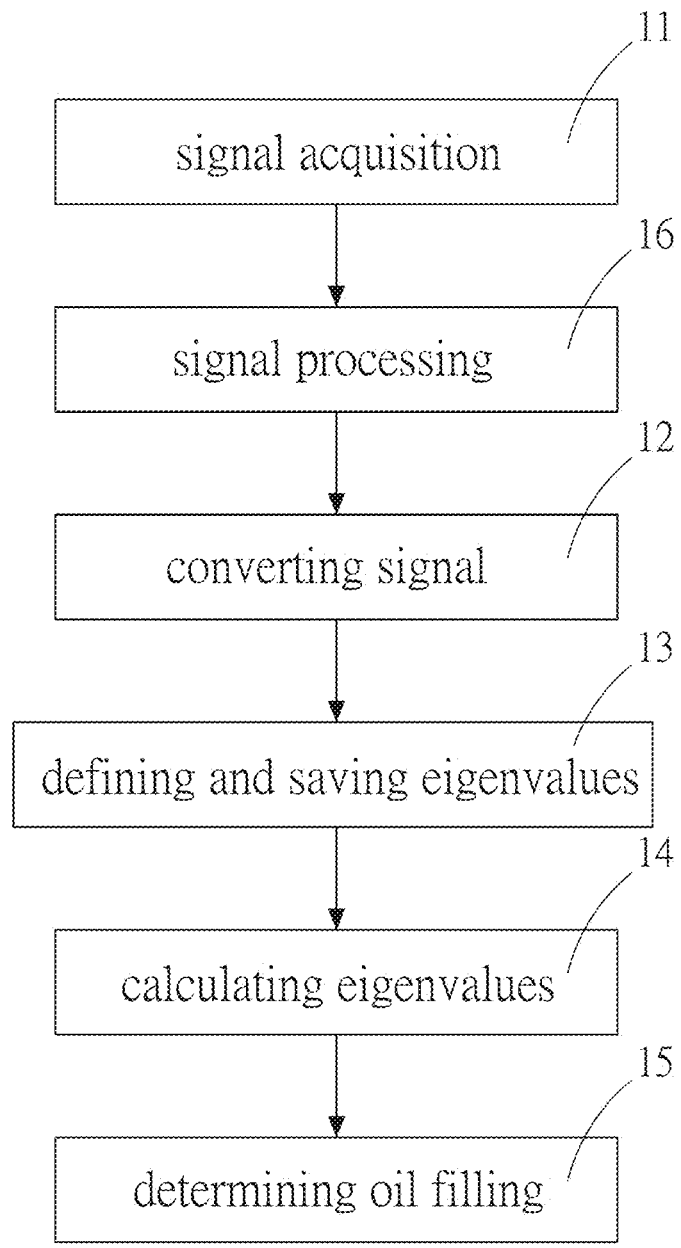
FIG. 6 is a flow chart showing the method for determining timing of oil filling for a ball screw in accordance with a second preferred embodiment of the present invention.

Referring then to FIG. 6, a method for determining timing of oil filling for a ball screw in accordance with a second preferred embodiment of the present invention is similar to the first embodiment, except that: the method of the second embodiment further comprises a step 16 of signal processing between the step 11 of signal acquisition and the step 12 of converting signal, and the step 16 of signal processing includes processing the physical signals produced in the step 11 of signal acquisition so as to reduce the noise contained in the physical signals, and outputting the processed physical signals which will be converted into the eigenvalues during the step 12 of converting signal.

Figure 7:
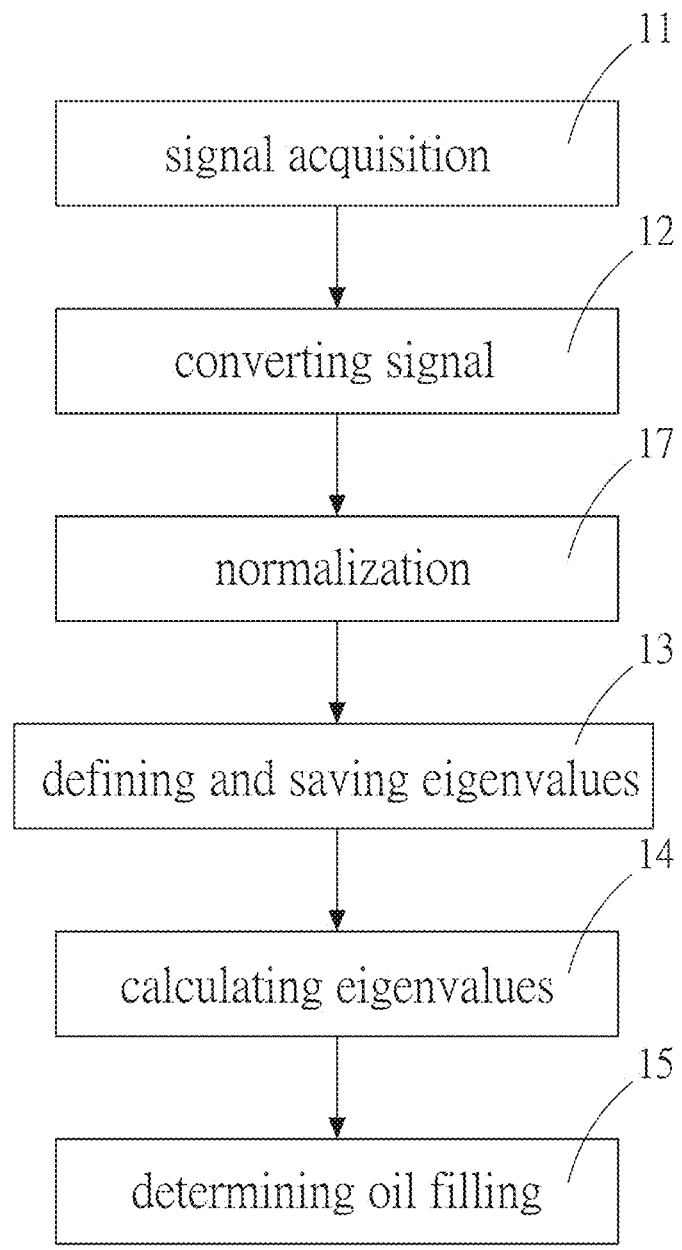
FIG. 7 is a flow chart showing the method for determining timing of oil filling for a ball screw in accordance with a third preferred embodiment of the present invention.

As shown in FIG. 7, a method for determining timing of oil filling for a ball screw in accordance with a third preferred embodiment of the present invention is similar to the first embodiment, except that: when the physical signals produced in the step 11 of signal acquisition are vibration signals produced by rotation of the ball screw, and when the rotating speed of the ball screw changes, the method of the third preferred embodiment of the present invention further comprises a step 17 of normalization between the step 12 of converting signal and the step 13 of defining and saving eigenvalues, and the step 17 of normalization is used to get rid of the vibration signal difference caused by the rotation speed change of the ball screw.

Figure 8:
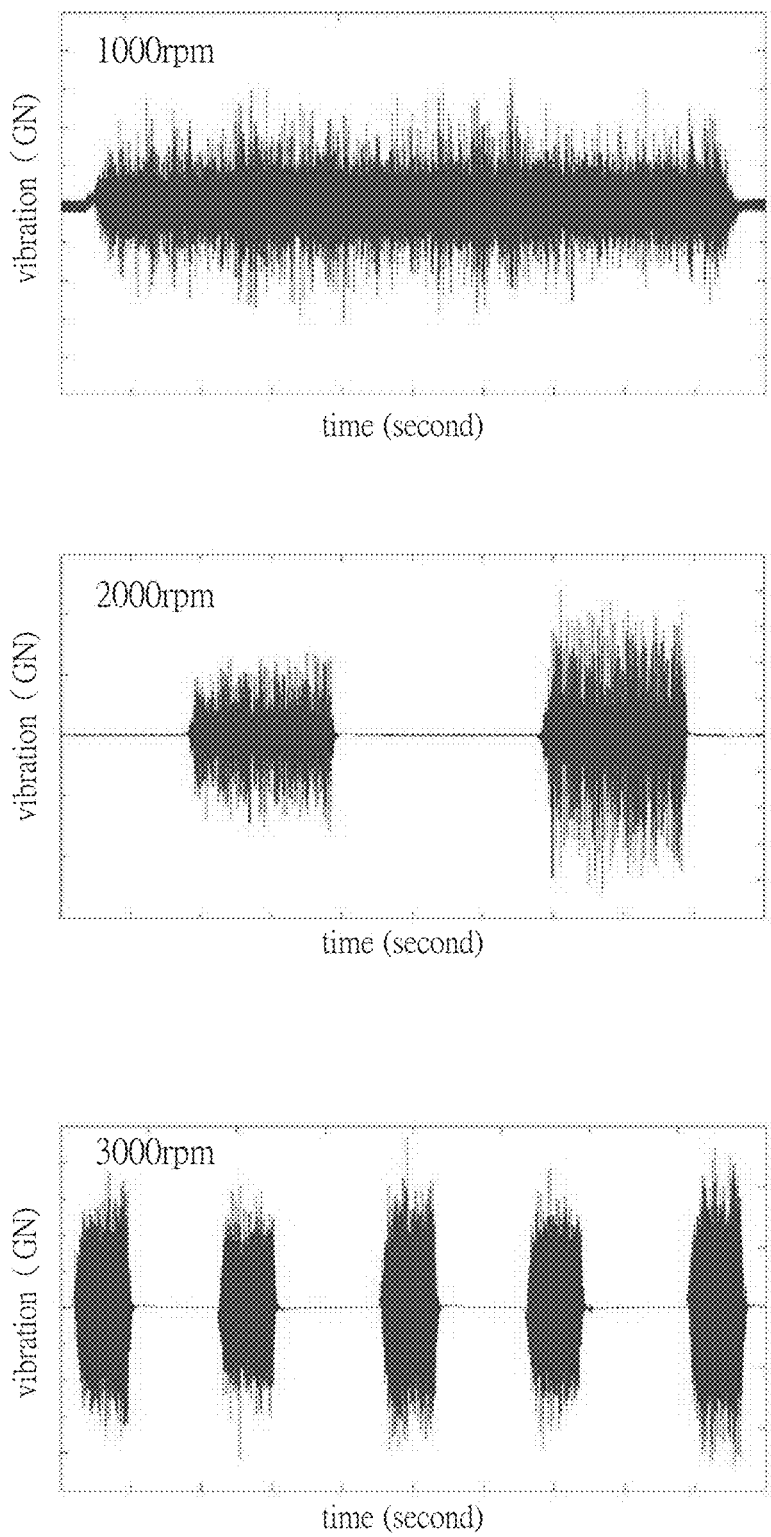
FIG. 8 shows that the physical signals produced in the step of signal acquisition in accordance with the third embodiment of the present invention are vibration signals produced by rotation of the ball screw.

More specifically: the step 11 of signal acquisition includes placing a detector on the ball screw to continuously acquire physical signals 23 generated during movement of the ball screw. In this embodiment, as shown in FIG. 8, the physical signals 23 are vibration signals produced when the ball screw 22 rotates at the rotation speeds of 1000, 2000, and 3000 rpm, wherein the ball screw 22 rotates at a rotation speed of 1000 rpm in the first time period, 2000 rpm in the second time period, and 3000 rpm in the third time period, respectively.

The step 12 of converting signal includes converting the physical signals 23 into eigenvalues by algorithm. In this embodiment, the eigenvalues are RMS (root mean square), and the method of converting the physical signals 23 into eigenvalues is same as the first embodiment, therefore further descriptions would be omitted.

The step 17 of normalization includes get rid of the vibration signal difference caused by the rotation speed change of the ball screw. Namely, when the rotation speed changes and does not repeat itself, a rotation speed correction factor is applied to the converted eigenvalues of the step 12, and the rotation speed correction factor is $NRMS = (RMSn - RMS_0)/RMS_0$; wherein RMSn is the current eigenvalues (for example, the RMS value after the ball screw rotates for 15 minutes), $RMS_0$ is the initial eigenvalues.

For example, $RMS_0 = 0.9$ (which is the RMS value converted from the vibration signals detected after oil is fed to the ball screw), $RMS_n = 1.8$ (which is the RMS value converted from the vibration signals detected after the ball screw rotates for a while), therefore, $N_{rms} = (1.8-0.9)/0.9 = 1$.

Figure 9:
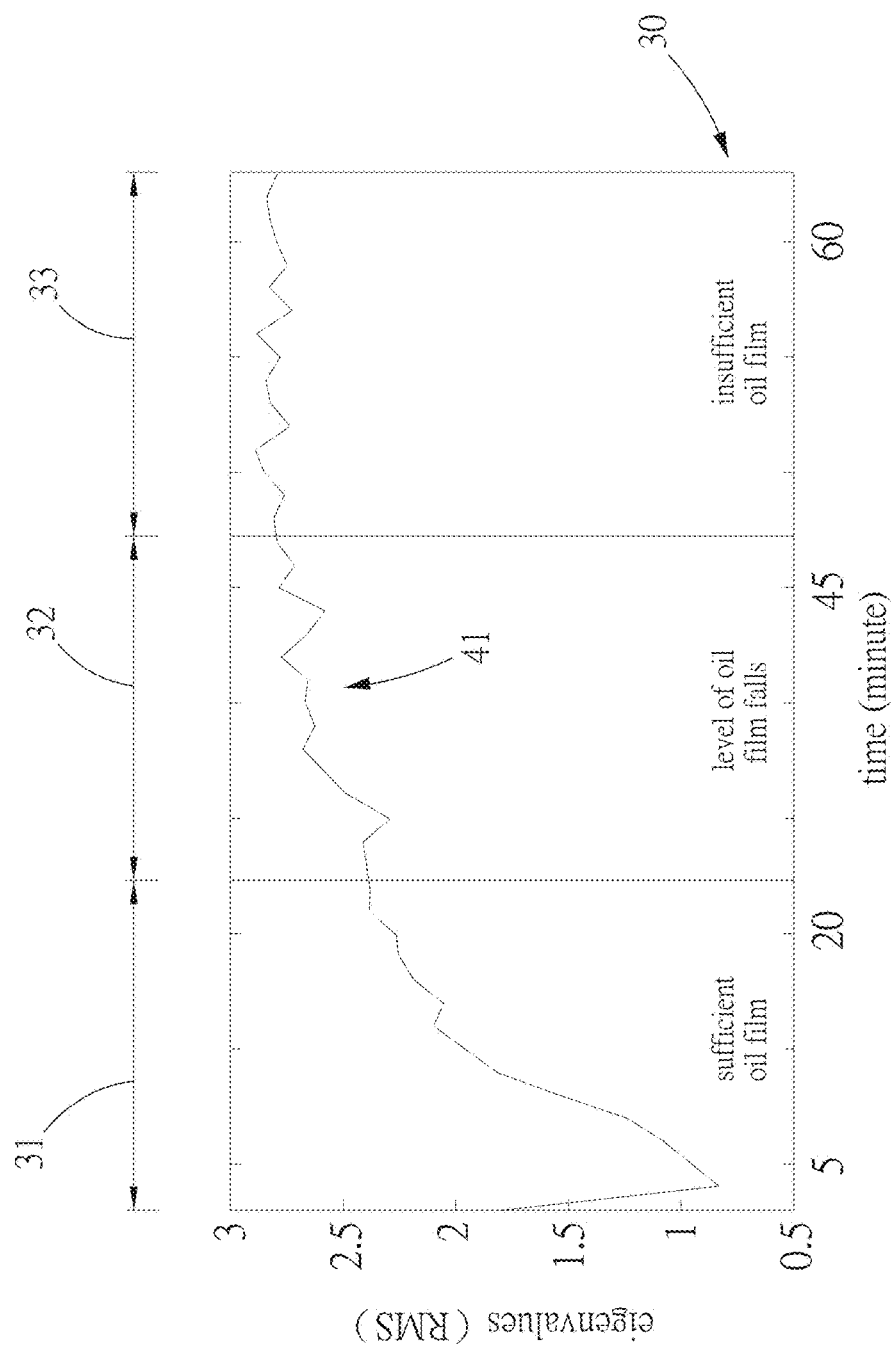
FIG. 9 shows the curve of eigenvalue change in accordance with the third embodiment of the present invention, which is set up on coordinates.

As shown in FIG. 9, the step 13 of defining and saving eigenvalues includes forming a curve 41 of eigenvalue change by defining and saving the after-normalization-of-step-17 relations between the eigenvalues and the time points on coordinates 30, wherein the longitudinal axis represents eigenvalues, and the horizontal axis represents the time periods.

The step 14 of calculating eigenvalues and the step 15 of determining oil filling are all the same as the first embodiment, therefore, further descriptions would be omitted.

In addition to being capable of reducing the implementation cost and making it easy to determine the timing of oil filling without requiring defining a threshold by setting up in advance a database, and comparing with the threshold set up by the database, the method of the third embodiment is further capable of determining the timing of oil filling even when the rotation speed of the ball screw changes.

Figure 10:
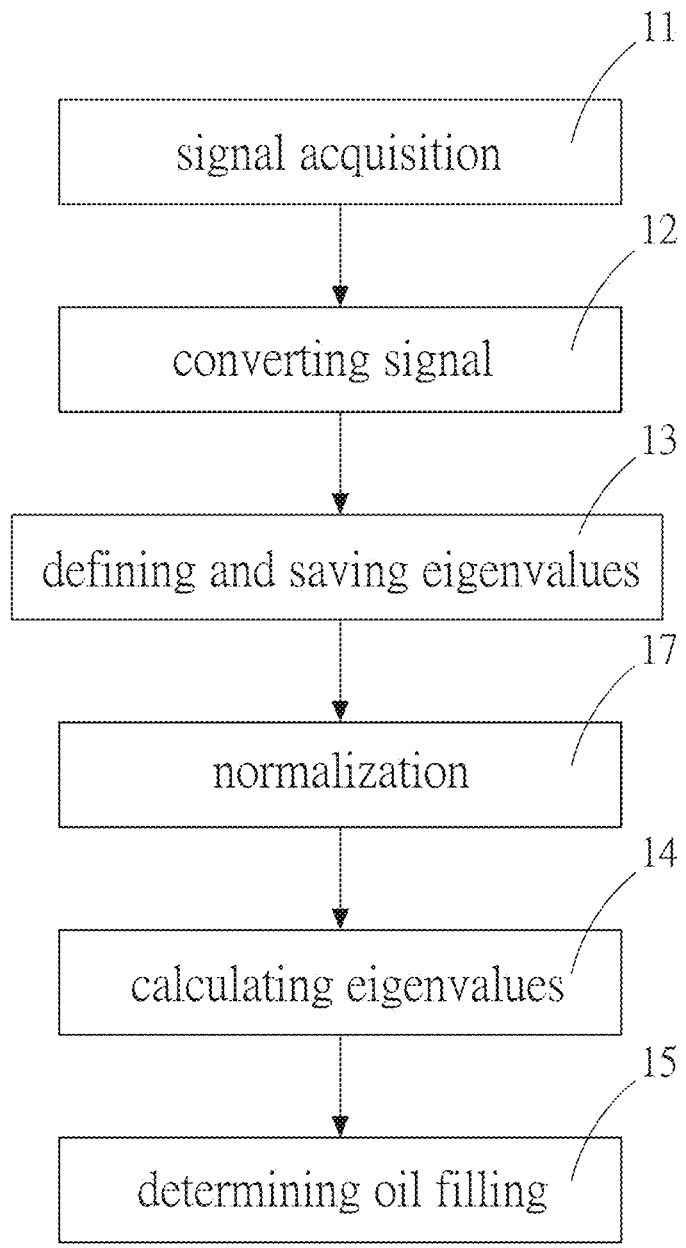
FIG. 10 is a flow chart showing the method for determining timing of oil filling for a ball screw in accordance with a fourth preferred embodiment of the present invention.

As shown in FIG. 10, a method for determining timing of oil filling for a ball screw in accordance with a fourth preferred embodiment of the present invention is similar to the first embodiment, except that: when the physical signals produced in the step 11 of signal acquisition are vibration signals produced by rotation of the ball screw, and when the rotating speed of the ball screw changes, the method of the fourth preferred embodiment of the present invention further comprises a step 17 of normalization between the step 13 of defining and saving eigenvalues and the step 14 of calculating eigenvalues, and the step 17 of normalization is used to get rid of the vibration signal difference caused by the rotation speed change of the ball screw.

Figure 11:
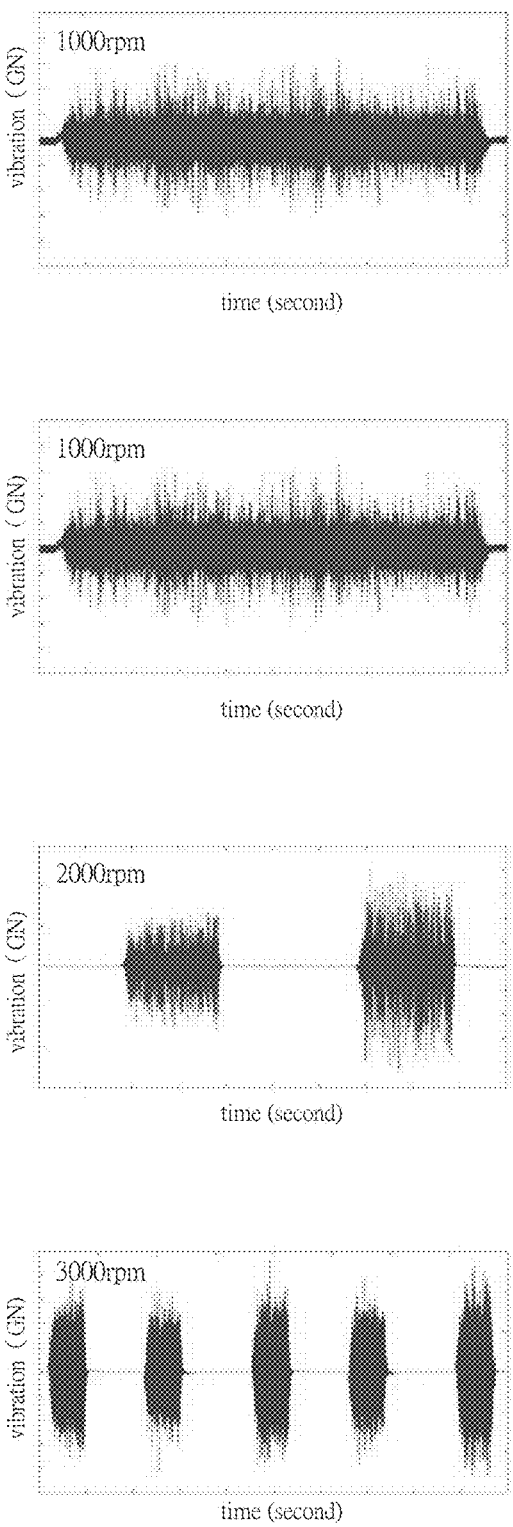
FIG. 11 shows that the physical signals produced in the step of signal acquisition in accordance with the fourth embodiment of the present invention are vibration signals produced by rotation of the ball screw.

More specifically: the step 11 of signal acquisition includes placing a detector on the ball screw to continuously acquire physical signals 23 generated during movement of the ball screw. In this embodiment, as shown in FIG. 11, the physical signals 23 are vibration signals produced when the ball screw 22 rotates at the rotation speeds of 1000, 2000, and 3000 rpm, and more particularly when the ball screw 22 rotates at a rotation speed of 1000 rpm in the first and second time periods, 2000 rpm in the third time period, and 3000 rpm in the fourth time period, respectively.

The step 12 of converting signal includes converting the physical signals 23 into eigenvalues by algorithm. In this embodiment, the eigenvalues are RMS (root mean square), and the method of converting the physical signals 23 into eigenvalues is same as the first embodiment, therefore further descriptions would be omitted.

Figure 12:
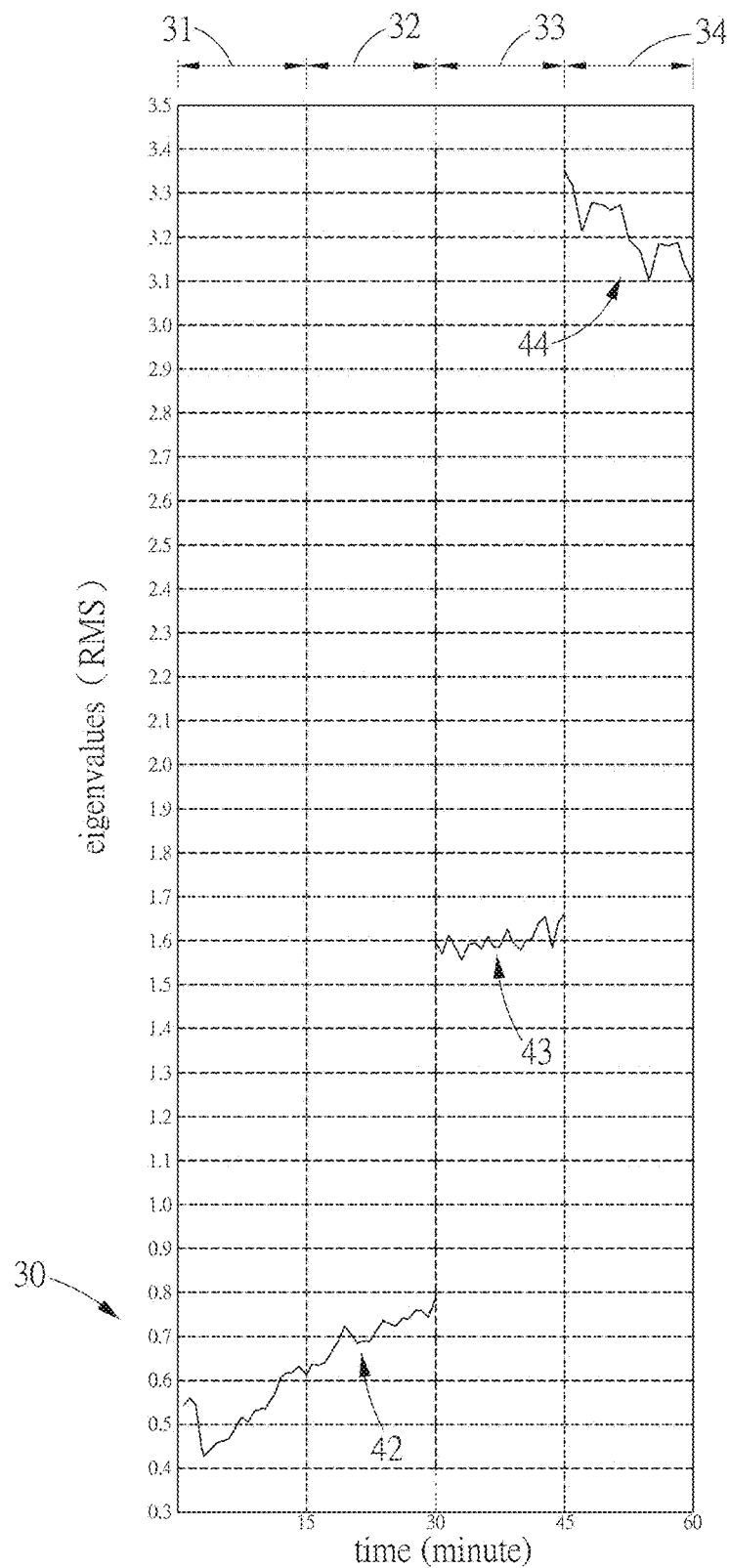
FIG. 12 shows the curve of eigenvalue change in accordance with the fourth embodiment of the present invention, which is set up on coordinates.

As shown in FIG. 12, the step 13 of defining and saving eigenvalues includes forming a curve 40 of eigenvalue change by defining and saving the relations between the eigenvalues and the time points on coordinates 30, wherein the longitudinal axis represents eigenvalues, and the horizontal axis represents the time periods and is divided into a plurality of time periods. In this embodiment, the horizontal axis of the coordinates 30 is divided by every 15 minutes into a first time period 31, a second time period 32, a third time period 33 and a fourth time period 34. The curve 42 of eigenvalue change within the first and second time periods 31, 32 is formed when the ball screw rotates at a speed of 1000 rpm from the 0-30 minutes, the curve 43 of eigenvalue change within the first and second time periods 31, 32 is formed when the ball screw rotates at a speed of 2000 rpm from the 30-45 minutes, and the curve 44 of eigenvalue change within the third time period 33 is formed when the ball screw rotates at a speed of 3000 rpm from the 45-60 minutes.

Figure 13:
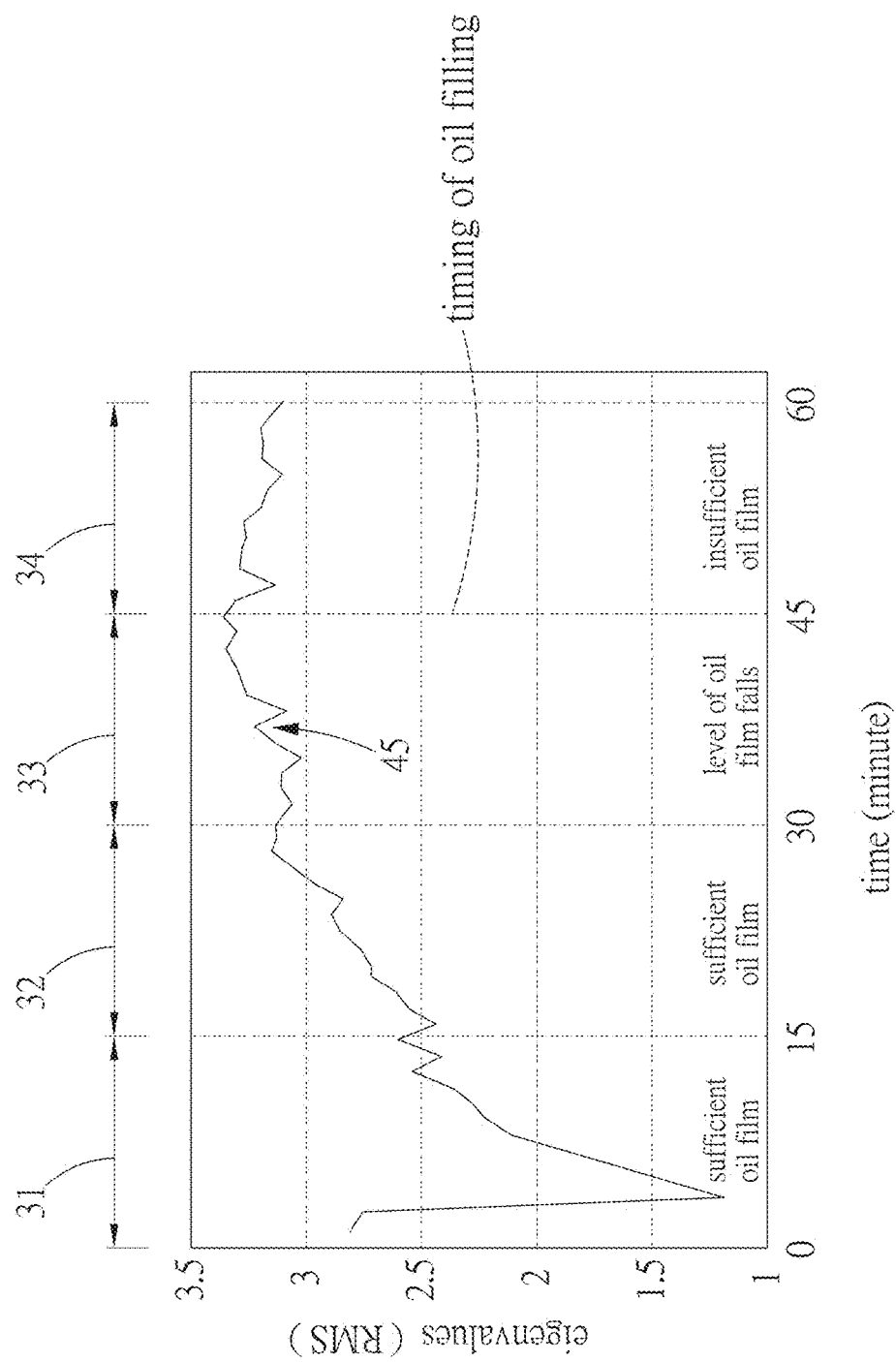
FIG. 13 shows an after-normalization-of-step curve of eigenvalue change in accordance with the fourth embodiment, which is formed on coordinates by defining and saving the relations between the eigenvalues and the time points.

The step 17 of normalization includes getting rid of the vibration signal difference caused by the rotation speed change of the ball screw. Namely, when the rotation speed changes and does not repeat itself, a rotation speed correction factor is applied to the curve of eigenvalue change, so as to form a curve 45 of eigenvalues change on the coordinates 30 after normalization, as shown in FIG. 13. In this embodiment, the step of normalization is the same as the third embodiment, therefore, further description would be omitted.

The step 14 of calculating eigenvalues and the step 15 of determining oil filling are all the same as the first embodiment, therefore, further descriptions would be omitted.

In addition to being capable of reducing the implementation cost and making it easy to determine the timing of oil filling without requiring defining a threshold by setting up in advance a database, and comparing with the threshold set up by the database, the method of the third embodiment is further capable of determining the timing of oil filling even when the rotation speed of the ball screw changes.

In addition to being capable of reducing the implementation cost and making it easy to determine the timing of oil filling without requiring defining a threshold by setting up in advance a database, and comparing with the threshold set up by the database, the method of the fourth embodiment is further capable of determining the timing of oil filling even when the rotation speed of the ball screw changes.

Figure 14:
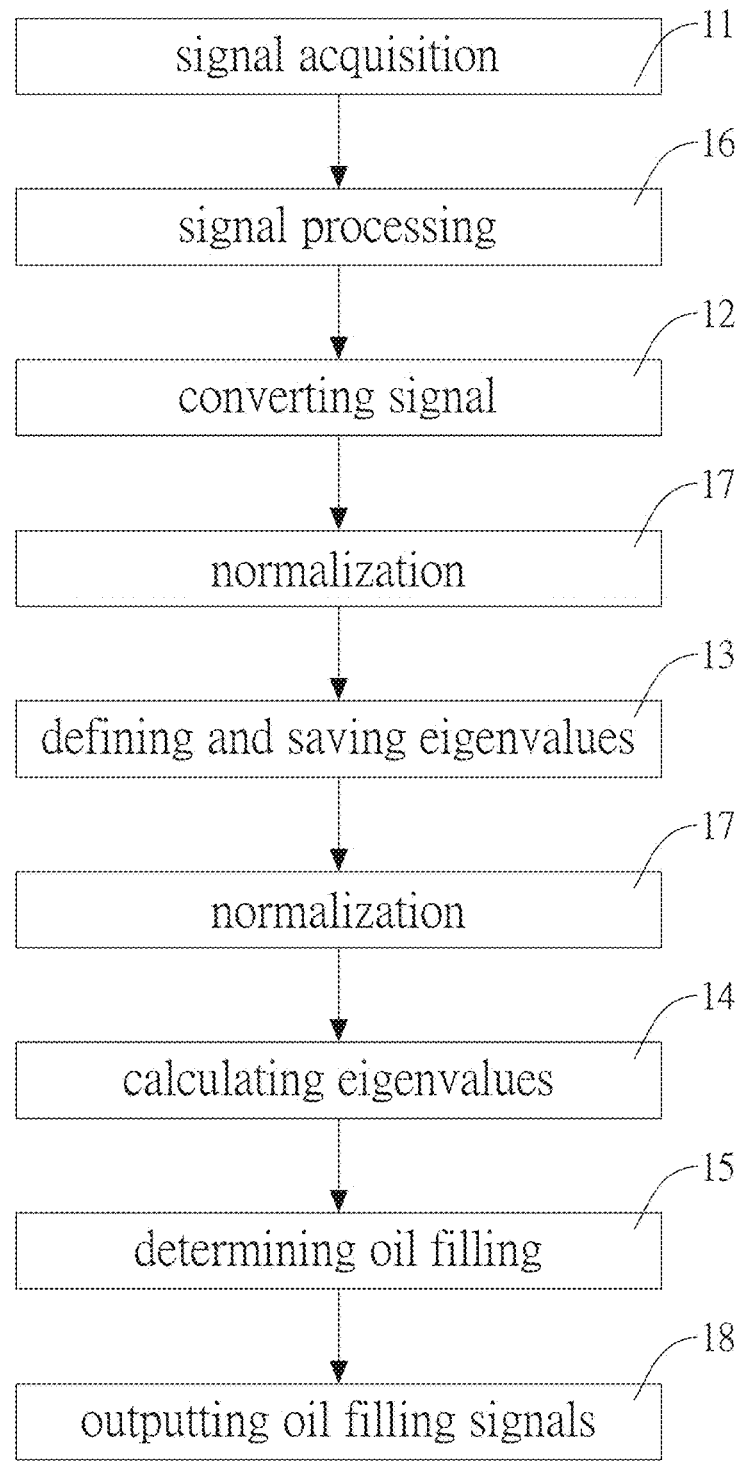
FIG. 14 is a flow chart showing the method for determining timing of oil filling for a ball screw in accordance with a fifth preferred embodiment of the present invention.

Referring to FIG. 14, a method for determining timing of oil filling for a ball screw in accordance with a fifth preferred embodiment of the present invention comprises: a step 11 of signal acquisition, a step 16 of signal processing, a step 12 of converting signal, a step 17 of normalization, a step 13 of defining and saving eigenvalues, a step 17 of normalization, a step 14 of calculating eigenvalues, a step 15 of determining oil filling, and a step 18 of outputting oil filling signals.

The step 11 of signal acquisition includes placing a detector 21 on the ball screw 22 to continuously acquire (detect) physical signals 23 generated during movement of the ball screw 22, and saving the physical signals in a back-end storage device (not shown). In this embodiment, the detector 21 is disposed on the nut 221 of the ball screw 22, and can also be disposed on the screw 222. The physical signals 23 are vibration signals produced when the ball screw 22 rotates at the rotation speed of 3000 rpm, and they can also be pressure wave signal or resistance signals produced when the ball screw 22 rotates.

The step 16 of signal processing between the step 11 of signal acquisition and the step 12 of converting signal, and the step 16 of signal processing includes processing the physical signals produced in the step 11 of signal acquisition so as to reduce the noise contained in the physical signals, and outputting the processed physical signals which will be converted into the eigenvalues during the step 12 of converting signal.

The step 12 of converting signal includes converting the physical signals 23 into eigenvalues by algorithm which is stored in advance in the back-end storage device. In this embodiment, the eigenvalues are RMS (root mean square), Envelopment RMS, Wavelet, Fast Fourier Transform (FFT, $$RMS = \frac{\sqrt{\sum_{i=1}^{n} x_i^2}}{n} = \sqrt{\frac{x_1^2 + x_2^2 + \ldots + x_n^2}{n}}$$

Wherein the n represents the number of data acquired, and the x represents the physical quantity of each data.

The step 17 of normalization includes getting rid of the vibration signal difference caused by the rotation speed change of the ball screw. Namely, when the rotation speed changes and does not repeat itself, a rotation speed correction factor is applied to the converted eigenvalues of the step 12, and the rotation speed correction factor is NRMS= $(RMSn-RMS_0)/RMS_0$; wherein RMSn is the current eigenvalues (for example, the RMS value after the ball screw rotates for 15 minutes), $RMS_0$ is the initial eigenvalues.

The step 13 of defining and saving eigenvalues includes forming a curve 40 of eigenvalue change by defining and saving the relations between the eigenvalues and the time points on coordinates 30, wherein the longitudinal axis represents eigenvalues, and the horizontal axis represents the time periods and is divided into a plurality of time periods. In this embodiment, the horizontal axis of the coordinates 30 is divided by every 15 minutes into a first time period 31, a second time period 32, a third time period 33 and a fourth time period 34.

The step 17 of normalization includes getting rid of the vibration signal difference caused by the rotation speed change of the ball screw. Namely, when the rotation speed changes and does not repeat itself, a rotation speed correction factor is applied to the converted eigenvalues of the step 12, and the rotation speed correction factor is NRMS= $(RMSn-RMS_0)/RMS_0$; wherein RMSn is the current eigenvalues (for example, the RMS value after the ball screw rotates for 15 minutes), $RMS_0$ is the initial eigenvalues.

The step 14 of calculating eigenvalues includes calculating each slope value based on every two neighboring time points and calculating the sum of the slope values within the first, second, third and fourth time periods, 31, 32, 33, 34. For example, the second time period 32 is equally divided into 15 time points, one minute for each time points, and the calculated eigenvalues by calculating each slope value based on every two neighboring time points refer to the slope value between the eigenvalue at the first time point and the eigenvalue at the second time point, the slope value between the eigenvalues of the second and third time points, the slope value between the eigenvalues of the third and fourth time points . . . , and the slope value between the eigenvalues of the fourteenth and fifteenth time points. Namely, each of the slope values is a ratio of a variation between two neighboring eigenvalues to a time variation between two neighboring time points.

The step 15 of determining oil filling includes determining whether the sum of the slope values within the respective time periods is smaller than a predetermined value. If the sum of the slope values within the respective time periods is smaller than the predetermined value, it means that there is no sufficient oil film, and if the sum of the slope values within the respective time periods is larger than the predetermined value, it means that there is sufficient oil film, and the predetermined value can be set as desired. As shown in FIG. 5, when the sum (which is 10 for instance) of the slope values within the first time period 31 is larger than the predetermined value (which is 0 for instance), and the sum (which is 5 for instance) of the slope values within the second time period 32 is larger than the predetermined value (which is 0 for instance), it means that the oil film within the ball screw is sufficient, and no oil filling is required. When the sum (which is 1 for instance) of the slope values within the third time period 33 is larger than but close to the predetermined value (which is 0 for instance), it means that the oil film within the ball screw is sufficient, and no oil filling is required, however the level of the oil film is falling (at a low level). When the sum (which is −1 for instance) of the slope values within the fourth time period 34 is smaller than the predetermined value (which is 0 for instance), it means that the oil film within the ball screw is insufficient, and it requires oil filling, and the optimum timing of oil filling can be at the connection between the third and fourth time periods 33, 34. In this embodiment, when the slope value is 0.01-0.8, it means that there is sufficient oil film, the oil film is receding when the slope value is 0.005-0.01, and there is no sufficient oil film when the slope value is less than 0.005.

The step 18 of outputting oil filling signals includes sending out, by the back-end storage device, the oil filling signals to PLC (Programmable Logic Controller) or a lubricating device (not shown) of the ball screw to start to lubricate the ball screw, when the back-end storage device detects that there is no sufficient oil film.

It is to be noted that the back-end storage device is a storage device disposed in the detector 21 or connected to a back end of the detector 21, and capable of acquiring signals, converting signals, processing signals, determining oil filling, outputting an oil-filling signal, and measuring vibration.

While we have shown and described various embodiments in accordance with the present invention, it is clear to those skilled in the art that further embodiments may be made without departing from the scope of the present invention.

What is claimed is:

1. A method for determining timing of oil filling for a ball screw comprising:
   a step of signal acquisition including placing a detector capable of measuring vibration on the ball screw to acquire vibration signals generated during movement of the ball screw, and saving the acquired vibration signals in a back-end storage device;
   a step of converting signals including converting the vibration signals into eigenvalues by using an algorithm which is stored in advance in the back-end storage device;
   a step of normalization being used to get rid of vibration signal difference caused by rotation speed change of the ball screw;
   a step of defining and saving eigenvalues including forming a curve of eigenvalue change by defining and saving relations between the eigenvalues and time points on coordinates, wherein a longitudinal axis represents eigenvalues, and a horizontal axis represents the time periods and is divided into a plurality of time periods;
   a step of normalization being used to get rid of vibration signal difference caused by rotation speed change of the ball screw;
   a step of calculating eigenvalues including calculating each slope value based on every two neighboring time points and calculating a sum of the slope values within the time periods;
   a step of determining oil filling including determining whether the sum of the slope values within the respective time periods is smaller than a predetermined value, when the sum of the slope values within the respective time periods is smaller than the predetermined value, there is no sufficient oil film, and if the sum of the slope values within the respective time periods is larger than the predetermined value, there is sufficient oil film; and
   a step of outputting oil filling signals including sending out, by the back-end storage device, the oil filling signals to a programmable logic controller or a lubricating device of the ball screw to start to lubricate the ball screw, when the back-end storage device detects that there is no sufficient oil film.

2. The method for determining timing of oil filling for the ball screw as claimed in claim 1 further comprises a step of signal processing between the step of signal acquisition and the step of converting signals, and the step of signal processing includes processing the vibration signals produced in the step of signal acquisition so as to reduce noise contained in the vibration signals, and outputting the processed vibration signals which will be converted into the eigenvalues during the step of converting signals.

3. The method for determining timing of oil filling for the ball screw as claimed in claim 1, wherein each of the slope values is a ratio of a variation between two neighboring eigenvalues to a time variation between two neighboring time points, there is sufficient oil film when the slope value is 0.01-0.8, the oil film is receding when the slope value is 0.005-0.01, and there is no sufficient oil film when the slope value is less than 0.005.

4. The method for determining timing of oil filling for the ball screw as claimed in claim 1, wherein the eigenvalues are root mean square, and Envelopment root mean square.

5. The method for determining timing of oil filling for the ball screw as claimed in claim 1, wherein the detector is disposed on a screw or a nut of the ball screw.

6. The method for determining timing of oil filling for the ball screw as claimed in claim 1, wherein the back-end storage device is a storage device connected to back end of the detector, and capable of acquiring signals, converting signals, processing signals, determining oil filling, and outputting an oil-filling signal.

7. The method for determining timing of oil filling for the ball screw as claimed in claim 1, wherein the back-end storage device is disposed in the detector, and capable of acquiring signals, converting signals, processing signals, determining oil filling, outputting an oil-filling signal, and measuring vibration.

* * * * *